United States Patent
Yu et al.

(10) Patent No.: US 11,181,358 B2
(45) Date of Patent: Nov. 23, 2021

(54) TIRE TREAD DETECTION APPARATUS AND TIRE PRESSURE DETECTOR SETTING APPARATUS WITH TIRE TREAD DETECTION FUNCTION

(71) Applicant: CUB ELECPARTS INC., Changhua County (TW)

(72) Inventors: San-Chuan Yu, Changhua County (TW); Tsan-Nung Wang, Changhua County (TW); Wei-Hung Ma, Changhua County (TW); Kuo-Ting Lee, Changhua County (TW); Ming-Li Chou, Changhua County (TW)

(73) Assignee: CUB ELECPARTS INC., Fuxing Township, Changhua County (TW)

(*) Notice: Subject to any disclaimer, the term of this patent is extended or adjusted under 35 U.S.C. 154(b) by 358 days.

(21) Appl. No.: 16/056,956

(22) Filed: Aug. 7, 2018

(65) Prior Publication Data

US 2019/0390951 A1 Dec. 26, 2019

(30) Foreign Application Priority Data

Jun. 20, 2018 (TW) ................................. 107121090

(51) Int. Cl.
*G01B 7/26* (2006.01)
*G01L 17/00* (2006.01)

(52) U.S. Cl.
CPC .............. *G01B 7/26* (2013.01); *G01L 17/005* (2013.01)

(58) Field of Classification Search
CPC . G01B 5/18; G01B 3/28; G01B 11/00; G01B 11/22; G01B 3/002; G01B 3/008; G01B 3/205; G01B 3/22; G01B 5/0028; G01B 2210/50; G01L 17/00; G01L 17/005; G01L 19/142; G01L 19/147; G01L 19/0092; G01L 19/08; G01L 19/083; G01L 19/086; G01L 5/28; G01L 7/166;
(Continued)

(56) References Cited

U.S. PATENT DOCUMENTS

| 4,631,831 A * | 12/1986 | Bacher ................... G01B 11/22 |
| | | 33/558 |
| 5,883,306 A * | 3/1999 | Hwang ................... G01L 17/00 |
| | | 73/146.8 |
| 7,010,969 B1 * | 3/2006 | Huang ................... G01M 17/02 |
| | | 73/146 |
| 10,302,531 B2 * | 5/2019 | Petrucelli ................... G01J 5/04 |
| 2009/0031795 A1 * | 2/2009 | Kokubu .............. B60C 23/0479 |
| | | 73/146.5 |

(Continued)

FOREIGN PATENT DOCUMENTS

| GB | 2460115 A | * 11/2009 | ............ G01M 17/02 |
| GB | 2460115 B | * 1/2012 | ............... G01B 5/18 |

*Primary Examiner* — John Fitzgerald
*Assistant Examiner* — Gedeon M Kidanu
(74) *Attorney, Agent, or Firm* — Muncy, Geissler, Olds & Lowe, P.C.

(57) ABSTRACT

A tire tread detection apparatus and tire pressure detector setting apparatus with tire tread detection function are provided. The tire tread detection apparatus includes a body casing, a driving unit, a measuring member, a position member, and a sense member. The driving unit, the measuring member, and the positioning member are connected. The driving unit is applied for driving the measuring member to protrude outward from the body casing for measuring the tire tread depth of the tire. The sense member generates a measurement signal corresponding to the positioning member, such that the measurement signal indicates a tire tread depth value. Therefore, the tire tread depth is efficiently and accurately acquired.

6 Claims, 11 Drawing Sheets

(58) Field of Classification Search
CPC .. G01M 17/02; G01M 17/027; G01M 17/013; B60C 11/243; B60C 11/246; B60C 23/0408; B60C 23/20; B60C 23/0493; B60C 11/24; B60C 23/0401; B60C 23/0433; B60C 23/001; B60C 23/003; B60C 23/007; B60C 23/008; B60C 23/009; B60C 23/02; B60C 23/041; B60C 23/0413; B60C 23/0423; B60C 23/0461; B60C 23/0496; B60C 23/0498; B60C 23/061; B60T 2240/06; B60T 2240/07; B60T 2240/08; E01F 9/696; F16D 2066/001; G02F 1/31; G02F 2203/12; H02S 10/12; H02S 20/21; H02S 20/22

See application file for complete search history.

(56) References Cited

U.S. PATENT DOCUMENTS

| | | | | |
|---|---|---|---|---|
| 2013/0145834 | A1* | 6/2013 | Mouchet | B60C 23/00 73/146.4 |
| 2013/0185005 | A1* | 7/2013 | Petrucelli | G01M 17/027 702/50 |
| 2014/0139332 | A1* | 5/2014 | Mouchet | B60T 17/18 340/442 |
| 2014/0259719 | A1* | 9/2014 | Thorley | G01B 5/18 33/701 |
| 2016/0258735 | A1* | 9/2016 | Chou | G01B 5/18 |
| 2016/0282141 | A1* | 9/2016 | Rajamani | G01D 5/14 |
| 2017/0115186 | A1* | 4/2017 | Petrucelli | G01M 17/027 |
| 2018/0238760 | A1* | 8/2018 | Trost | G01L 17/00 |

* cited by examiner

TIRE TREAD DETECTION APPARATUS AND TIRE PRESSURE DETECTOR SETTING APPARATUS WITH TIRE TREAD DETECTION FUNCTION

BACKGROUND OF THE INVENTION

1. Field of the Invention

The present invention relates to tire detection fields, and more particularly, to a tire pressure detector setting apparatus with tire tread detection function.

2. Description of the Related Art

Vehicle is a commonly used transportation for movement. Besides the normal functioning mechanical parts of the vehicle, tread depth of the tire is a key element for the vehicle driving safety. The tire tread depth determines the shock absorbing and water discharging performance of a tire. When the tire tread depth becomes shallower due to the abrasion after usage, the frictional force of the tire also becomes lower, preventing the tire from efficiently gripping the road and possibly causing the vehicle to slip during a high-speed driving or emergency brake. Further, a flat tire may occurs, so as to affect the vehicle driving safety. Therefore, for securing the vehicle driving safety, the tire tread depth shall be examined before the vehicle getting on the road.

The tire tread depth is able to be examined by use of a detection tool. The US patent US20140139332A1 discloses a vehicle tire inspection tool. With the head portion of the tread depth device provided with a pin, and by use of the pin end being inserted in the tire tread, the resistance variation is detected based on the variation of the strain gauge, such that the tire tread depth of the tire is acquired.

However, the bonding quality will affect the inspection accuracy. Based on the reason that the resistance value of a metal wire is applied for inspecting the variation, the strain gauge has to be stably and accurately bonded to the inspection point for achieving the most accurate inspection result. If the bonding of the strain gauge is not properly carried out, the inspection accuracy will be affected, failing to acquire an accurate tire tread depth by use of the strain gauge.

In addition, in the citation above, the pin permanently protrudes from the head portion. When the pin end is inserted in the tire tread and reaches the bottom of the tire tread, the portion of the pin will retract into the head portion, except for the portion inserted in the tire tread. Therefore, the strain gauge generates a variation amount according to the retraction of the pin into the head portion, so as to acquire a tire tread depth.

However, due to the pin permanently protruding from the head portion, the pin is easily bent or broken under an external force imposed thereon, causing the damage of the inspection tool.

SUMMARY OF THE INVENTION

For improving the issues, the present invention discloses a tire tread detection apparatus and a tire pressure detector with tire tread detection function for efficiently and accurately acquiring the tire tread depth, so as to improve the inaccuracy issue of detection and prevent possible damage.

A tire tread detection apparatus in accordance with an embodiment of the present invention for detecting a depth of a tire tread comprises:

a body casing;

a driving unit disposed in the body casing;

a measuring member disposed in the body casing and connected with the driving unit, the driving unit driving the measuring member to move, such that the measuring member protrudes out from the body casing to measure the depth of the tire tread;

a positioning member disposed in the body casing and connected with the driving unit; and a sense member fixed in the body casing, the sense member generating a measurement signal as a tread depth value of the tire tread according to the positioning member.

With such configuration, when the measuring member of the tire tread detection apparatus is applied for measuring the tire tread depth, the driving unit drives the measuring member to protrude out from the body casing for measuring the tire tread depth. Therefore, the detection tool does not permanently protrude, thus preventing the detection tool from possible damage.

Also, when the measuring member protrudes out from the body casing for measuring the tire tread depth, a measurement signal is generated by the sense member and the positioning member that are corresponding with each other, such that the measurement signal is interpreted as the tread depth value of the tire tread. Therefore, by acquiring the tread depth value in a sensing manner, the tire tread depth is efficiently and accurately detected, thus improving the detection inaccuracy caused by the variation of the traditional strain gauge.

Also, a tire pressure detector setting apparatus with tire tread detection function, which is coupled with a tire pressure detector, comprises:

a casing;

a setting module disposed in the casing, the setting module comprising a plurality of communication protocol information, such that when the tire pressure detector is coupled with the setting module, one of the plurality of communication protocol of the setting module is written in the tire pressure detector; and a tire tread detection module disposed in the casing, the tire tread detection module comprising a driving unit, a measuring member, a positioning member, and a sense member, the driving unit being coupled with the measuring member and the positioning member, such that the driving unit drives the measuring member to protrude out from the casing to measure a depth of a tire tread, and the measurement signal is generated by the sense member as a tread depth value of the tire tread according to the positioning member.

With such configuration, the tire pressure detector with tire tread detection function is allowed to set up the communication protocol of the tire pressure detector through the setting module. Therefore, the user is able to detect the tire tread depth by use of the tire tread detection module when installing the tire pressure detector or carrying out the tire pressure detection process.

DETAILED DESCRIPTION OF THE INVENTION

The aforementioned and further advantages and features of the present invention will be understood by reference to the description of the preferred embodiment in conjunction with the accompanying drawings where the components are illustrated based on a proportion for explanation but not subject to the actual component proportion.

Referring to FIG. 1 to FIG. 5, a tire tread detection apparatus 100 for detecting the tire tread depth of a tire 200 in accordance with an embodiment of the present invention comprises a body casing 10, a driving unit 20, a measuring member 30, a positioning member 40, a sense member 60, a processing unit 70, a power module 80, and a display module 90.

Figure 1:
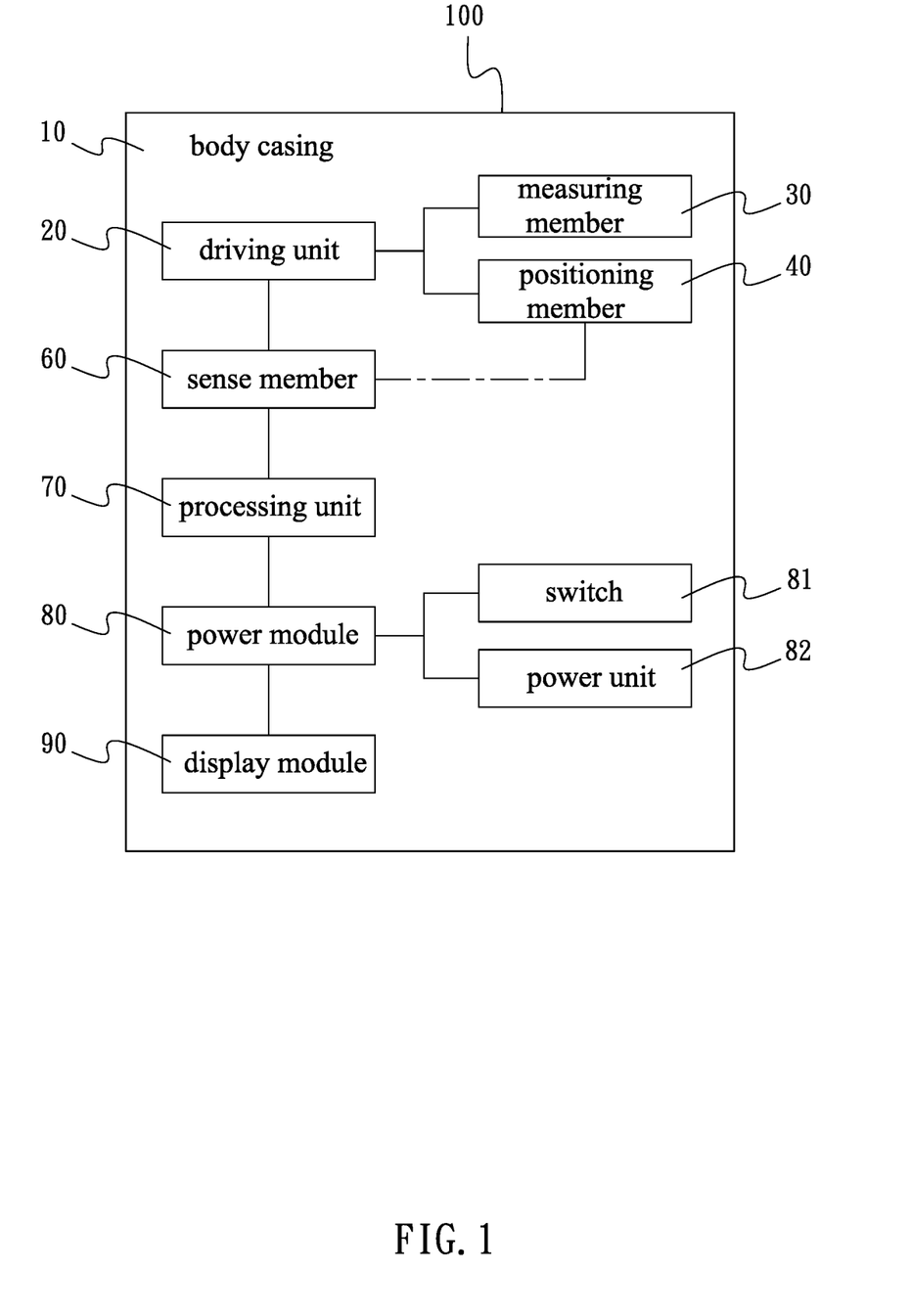
FIG. 1 is a schematic view illustrating the structure of the tire tread detection apparatus in accordance with an embodiment of the present invention.

The driving unit 20, the sense member 60, the processing unit 70, and the display module 90 are coupled with the power module 80, such that the power module 80 supplies power to the driving unit 20, the sense member 60, the processing unit 70, and the display module 90.

Further, the driving unit 20 is connected with the measuring member 30 and the positioning member 40. The driving unit 20 is applied for driving the measuring member 30 to move for measuring the tread depth of the tire 200. With the movement of the measuring member, a sensing connection is established between the positioning member 40 and the sense member 60, so as to generate a measuring signal. Then, the processing unit 70 receives the measuring signal and produces a tread depth value, which is displayed on the display module 90.

Figure 2:
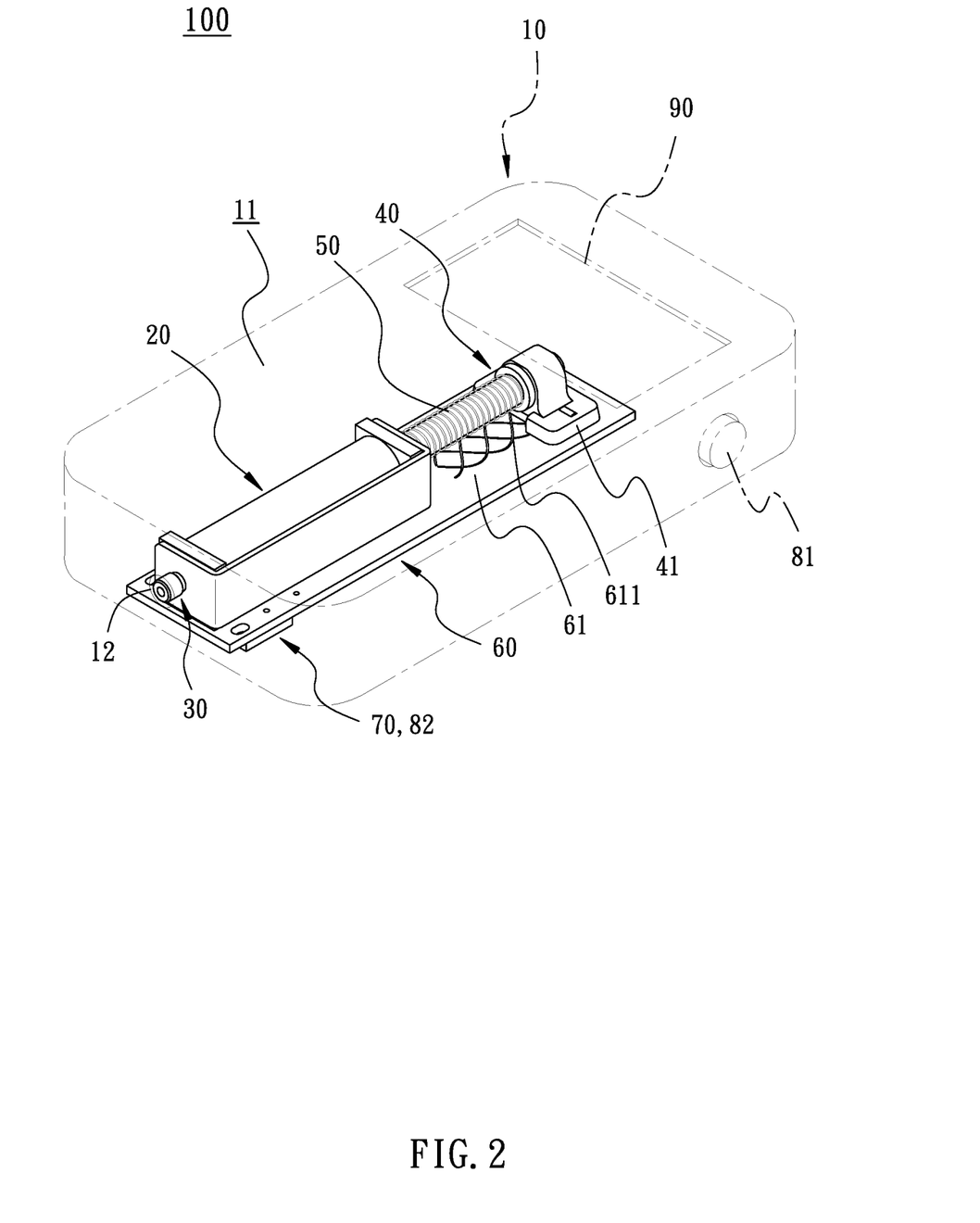
FIG. 2 is a schematic perspective view of the tire tread detection apparatus in accordance with an embodiment of the present invention.

The body casing 10 has a housing space 11 therein, and further has an opening 12 disposed at one lateral of the body casing 10. The opening 12 is connected with the housing space 11.

The driving unit 20 is disposed in the housing space 11 of the body casing 10. When the power module 80 supplies power to the driving unit 20, the power energizes the electromagnetic coil of the driving unit 20, such that the measuring member 30 and the positioning member 40 are driven to linearly move with respect to the body casing 10.

The measuring member 30 is disposed in the housing space 11 of the body casing 10. The measuring member 30 is formed in a rod shape and comprises a detection end 31 disposed in adjacent to the opening 12. The detection end 31 is applied for being inserted in the tread groove 201 of the tire 200. The detection end 31 has an outer diameter preferably not larger than 6 mm, so as to be applied for various models of tire 200. The driving unit 20 is allowed to drive the measuring member 30 to move between a retract position and a protrude position. When the measuring member 30 is at the retract position, the detection end 31 of the measuring member 30 is placed between the opening 12 and the housing space 11. When the measuring member 30 moves from the retract position to the protrude position, the detection end 31 of the measuring member 30 protrudes out from the body casing 10 via the opening 12, so as to protrude into the tread groove 201 of the tire 200 for measuring the tread depth of the tire 200. Therein, the distance between the retract position and the protrude position is defined as the tread depth of the tire 200.

Figure 3:
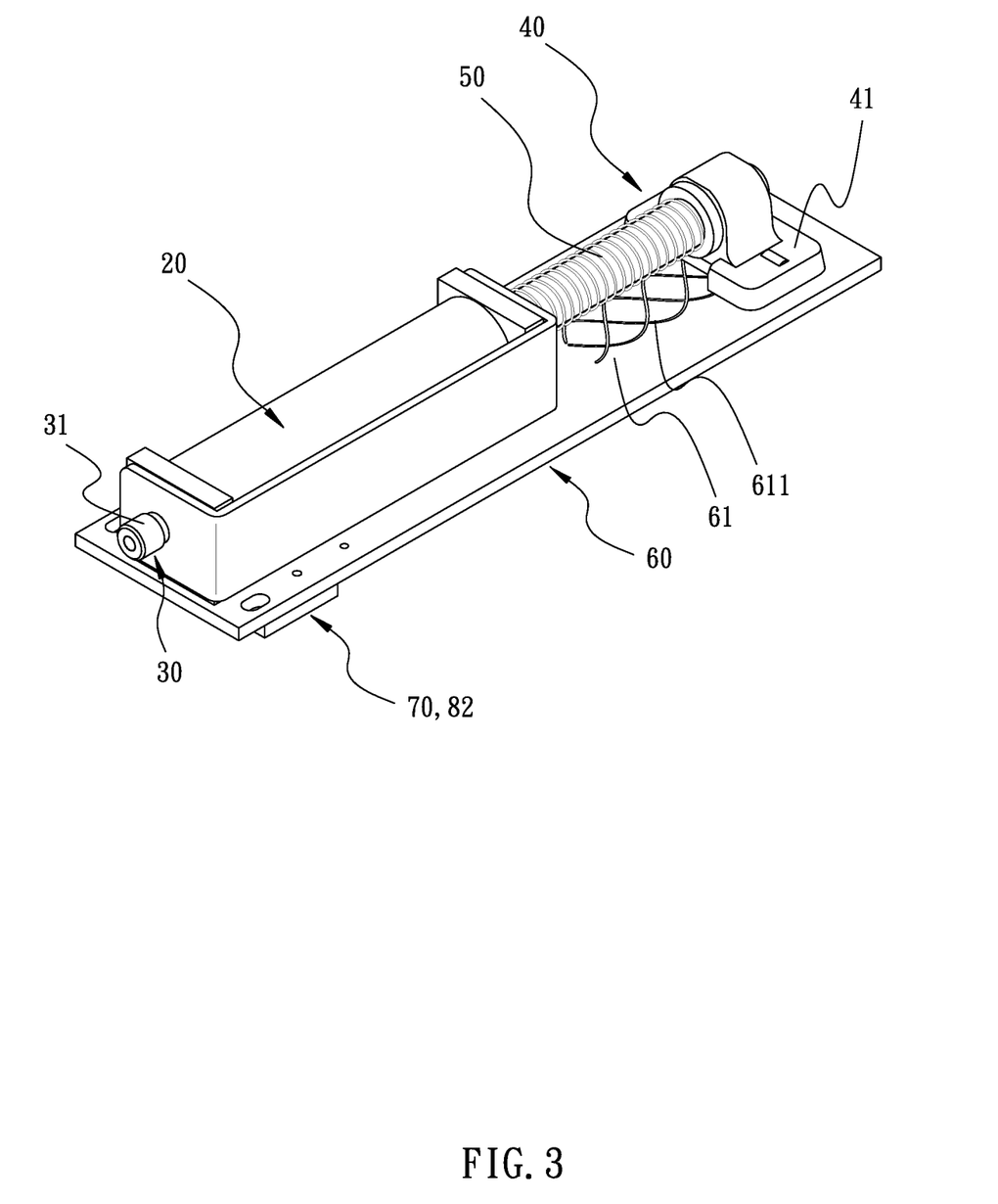
FIG. 3 is a schematic perspective view of the tire tread detection apparatus without the body casing.
Figure 4:
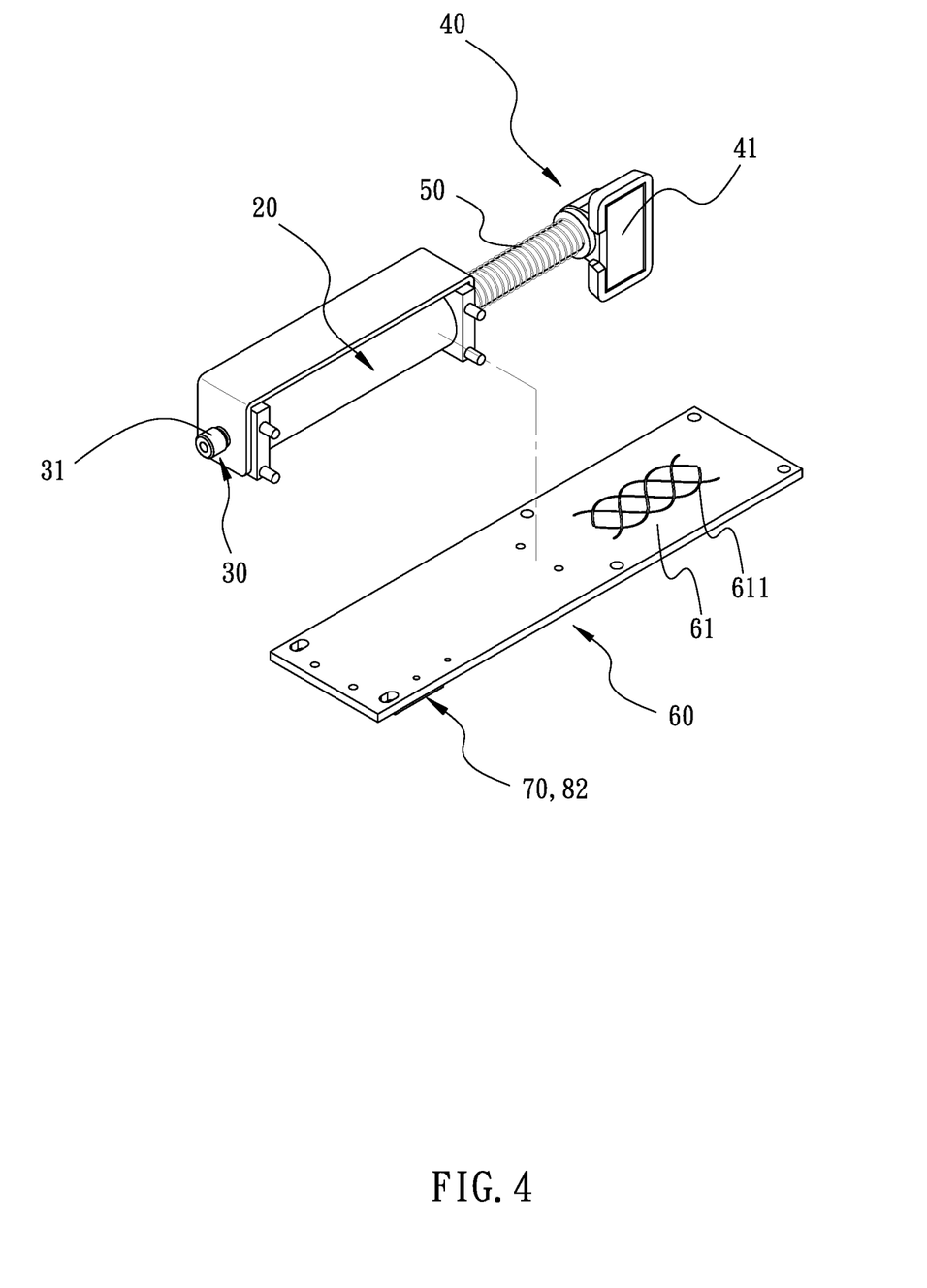
FIG. 4 is an exploded view of FIG. 3.

The positioning member 40 is disposed in the housing space 11 of the body casing 10. The positioning member 40 has a sensing portion 41 for establishing a sense connection with the sense member 60. Therein, the sensing portion 41 is allowed to be formed in a metal material. When the driving unit 20 drives the measuring member 30 to move, the positioning member 40 is driven to move together with the measuring member 30. In an embodiment of the present invention, the positioning member 40 has a spring 50 disposed at an outer periphery of thereof, with two ends of the spring 50 resting against the driving unit 20 and the sensing portion 41. Therein, when the driving unit 20 drives the measuring member 30 to move from the retract position to the protrude position, the spring 50 is compressed.

The sense member 60 is fixed in the housing space 11 of the body casing 10. In an embodiment of the present invention, the sense member 60 is disposed at one end of the measuring member 30 away from the detection end 31. The sense member 60 is approximately formed in a plate shape, with a sense area 61 disposed at one lateral of the sense member 60 facing the positioning member 40. The sense area 61 corresponds to a movement range of the positioning member 40. The sense area 61 has a detection pattern 611, such that the power supplied by the power module 80 is conducted to the detection pattern 611. The detection pattern 611 is formed of a magnetic or metal material. When the sensing portion 41 of the positioning member 40 covers a portion of the detection pattern 611, the measurement signal generated by the sense member 60 varies according to the covered portion of the detection pattern 611.

More specifically, when the power supplied by the power module 80 is conducted to the detection pattern 611, the portion of the detection pattern 611 of the sense area 61 covered by the sensing portion 41 formed of metal material produces a magnetic field. Therefore, the measurement signal generated by the sense member 60 is defined as the area range of the magnetic field. Also, the minimum detection unit is improved to reach a precision of 0.1 mm.

The processing unit 70 is disposed in the housing space 11 of the body casing 10 and coupled with the sense member 60. The sense member 60 transmits the measurement signal to the processing unit 70. The processing unit 70 performs a calculation with the measurement signal to acquire the tread depth value. In an embodiment of the present invention, the tread depth value is a character string formed of a numerical value.

The power module 80 is disposed at the body casing 10 and comprises a switch 81 and a power unit 82. The switch 81 is applied for controlling the power unit 82 to provide the power to the driving unit 20, the sense member 60, the processing unit 70, and the display module 90. The switch 81 is disposed at an outer lateral of the body casing 10 away from the opening 12. The switch 81 is allowed to be chosen from a normal open or normal close switch, which is not limited in the embodiment of the present invention. The power unit 82 is disposed in the housing space 11 of the body casing 10. The power unit 82 is allowed to be chosen from a rechargeable form or battery form, which is not limited in the embodiment of the present invention.

The display module 90 is disposed at the outer lateral of the body casing 10. In an embodiment of the present invention, the display module 90 is disposed at the outer lateral of the body casing 10 away from the opening 12, wherein the display module 90 and the switch 81 are disposed at the same lateral of the body casing 10.

Figure 5:
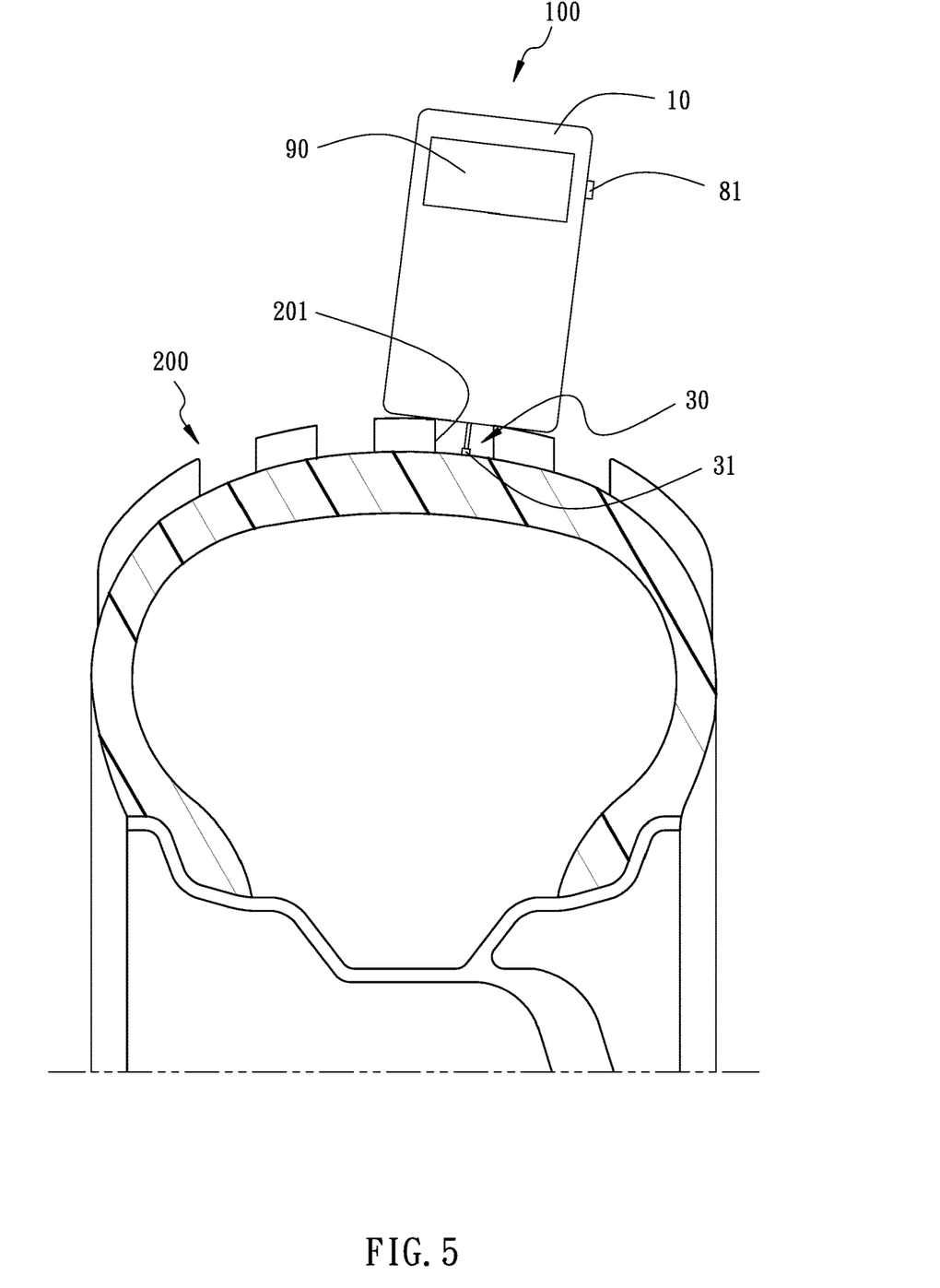
FIG. 5 is a schematic view of the operation status of the tire tread detection apparatus, illustrating the measuring member being inserted in the tread groove of the tired tread.

Referring to FIG. 2, FIG. 3, and FIG. 5, when measuring the tread depth of the tire 200, the user rests one lateral of the body casing 10 of the tire tread detection apparatus 100 provided with the opening 12 against the tread face of the tire 200, and aligns the opening 12 with the tread groove 201 of the tire 200. Next, the user presses the switch 81, so that the power unit 82 supplies the power to the driving unit 20 and the driving unit 20 drives the measuring member 30 to move from the retract position to the protrude position, whereby the detection end 31 of the measuring member 30 rests against the bottom of the tread groove 201. Meanwhile, the positioning member 40 moves together with the measuring member 30 until the detection end 31 reaches the bottom of the tread groove 201, so that the sensing portion 41 covers a portion of the detection pattern 611, such that the sense member 60 generates the measurement signal according to the covered portion of the detection pattern 611, and the processing unit 70 transforms the measurement signal to a tread depth value. Then, the processing unit 70 transmits the tread depth value to the display module 90, such that the display module 90 displays the tread depth value to inform the user about the current tread depth of the tire 200.

Further, when the detection end 31 reaches the bottom of the tread groove 201, the power module 80 stops supplying the power to the electromagnetic coil of the driving unit 20. With the resilient force of the spring 50, the measuring member 30 will move from the protrude position back to the retract position, such that the detection end 31 of the measuring member 30 completely retracts into the opening 12, completing the tread depth detection of the tire 200.

Referring to FIG. 6 to FIG. 11, a tire pressure detector setting apparatus 300 with tire tread detection function is provided for being coupled with the tire pressure detector. The tire pressure detector setting apparatus 300 comprises a casing 1, a setting module 2, a tire tread detection module 3, a power module 4, and a display module 5. The setting module 2, the tire tread detection module 3, and the power module 4 are disposed inside the casing 1, and the display module 5 is disposed at an outer lateral of the casing 1. The power module 4 supplies the power to the setting module 2, the tire tread detection module 3, and the display module 5.

Figure 7:
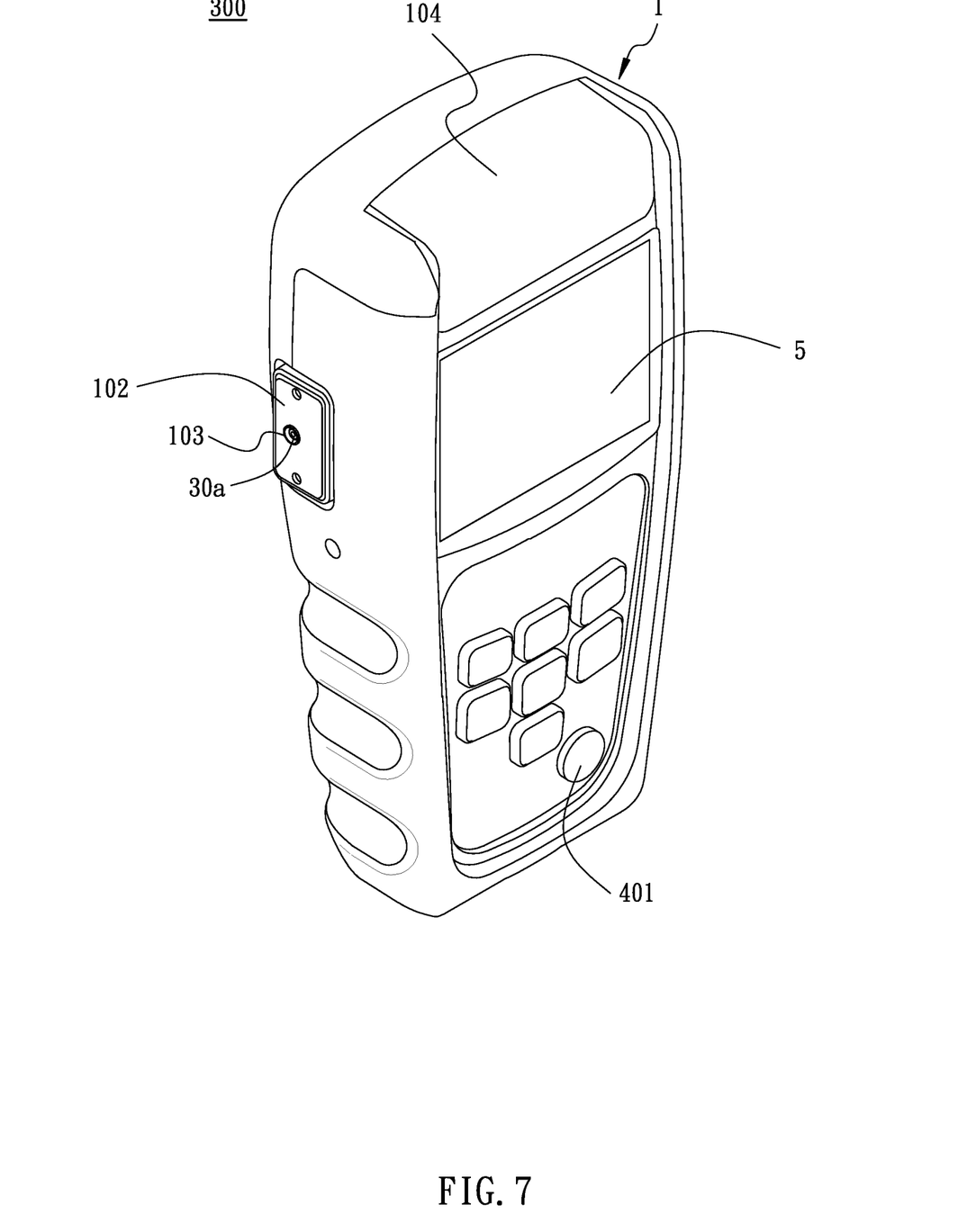
FIG. 7 is schematic perspective view of the tire pressure detector setting apparatus.
Figure 8:
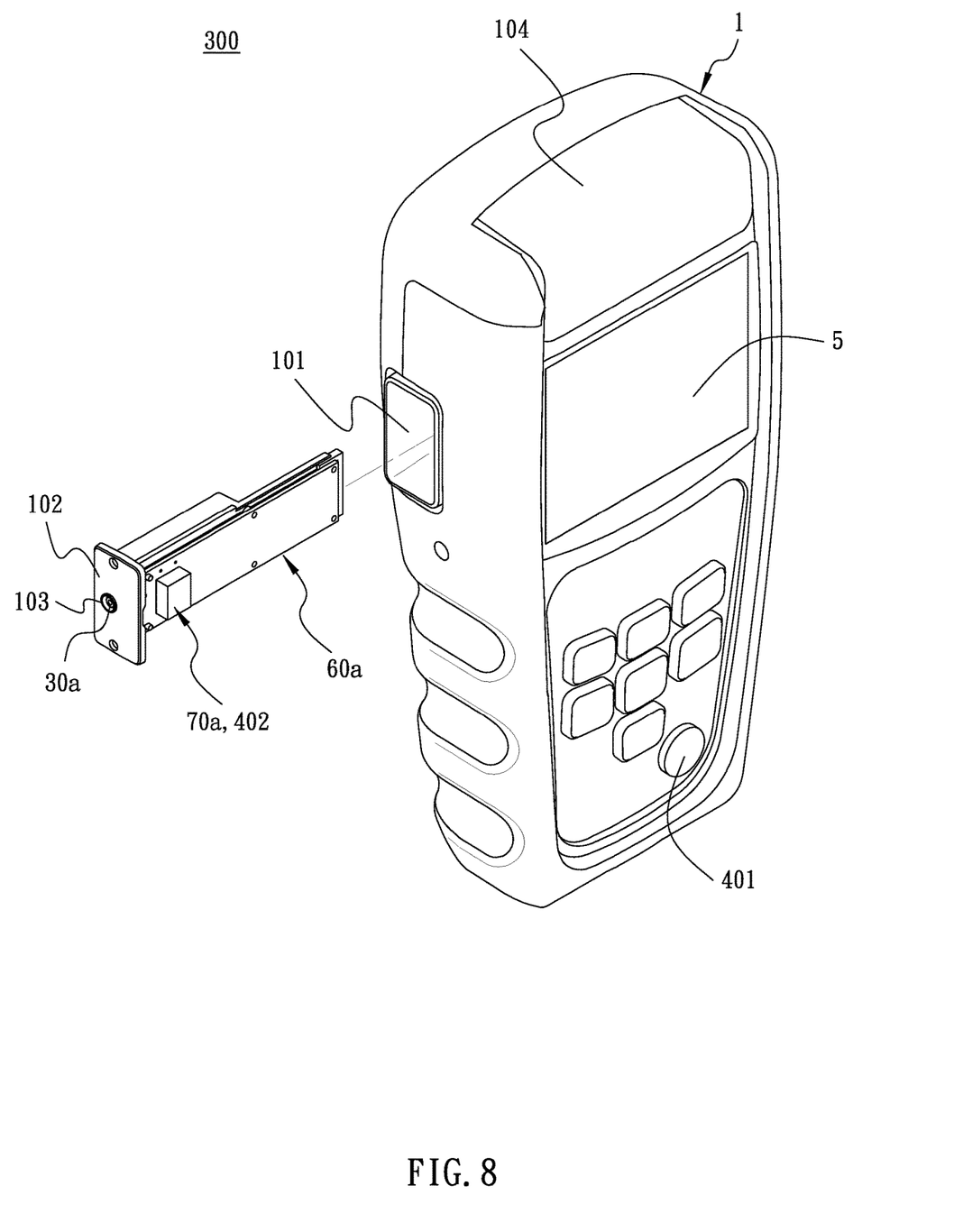
FIG. 8 is a partially exploded view of FIG. 7.

The casing 1 has a housing recess 101 disposed at a lateral thereof, with the housing recess 101 connected with the inside of the casing 1. The housing recess 101 houses the tire tread detection module 3, wherein the casing 1 has a cover 102 corresponding to the housing recess 101 for sealing tire tread detection module 3 in the housing recess 101. Therein, the cover 102 is provided with an opening 103. Also, a connection seat 104 is disposed at an outer lateral of the casing 1, such that the tire pressure detector (not shown) is placed at the connection seat 104.

Figure 6:
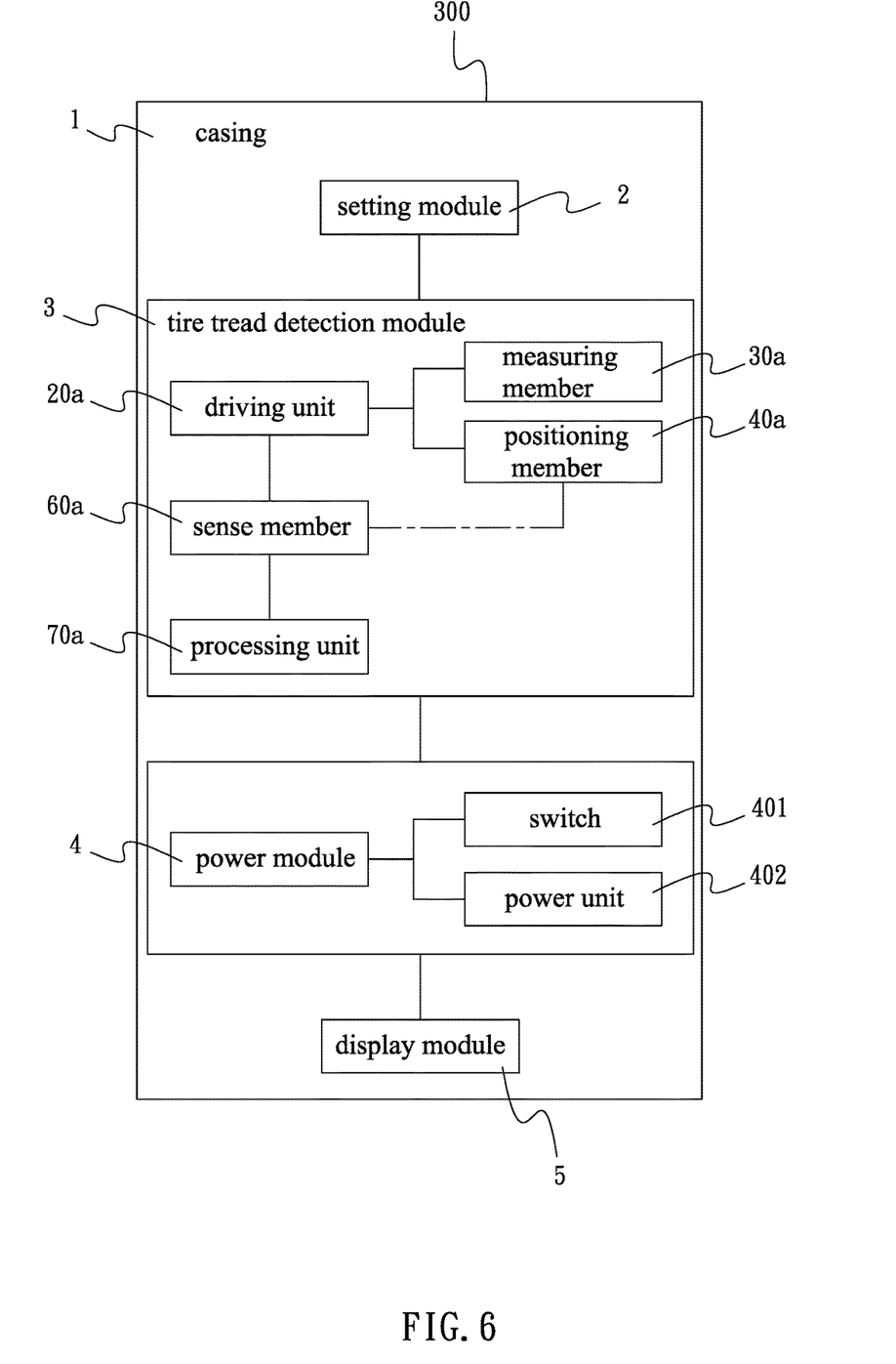
FIG. 6 is a schematic view illustrating the structure of the tire pressure detector setting apparatus.

The setting module 2 is disposed in the casing 1 and comprises a plurality of communication protocol information. The setting module 2 is electrically connected with the tire pressure detector through the connection seat 104, such that one of the communication protocol information is able to be written into the tire pressure detector. In other embodiments of the present invention, the casing 1 does not has the connection seat 104, and the setting module 2 writes one of the communication protocol information into the tire pressure detector through a wireless connection.

Figure 9:
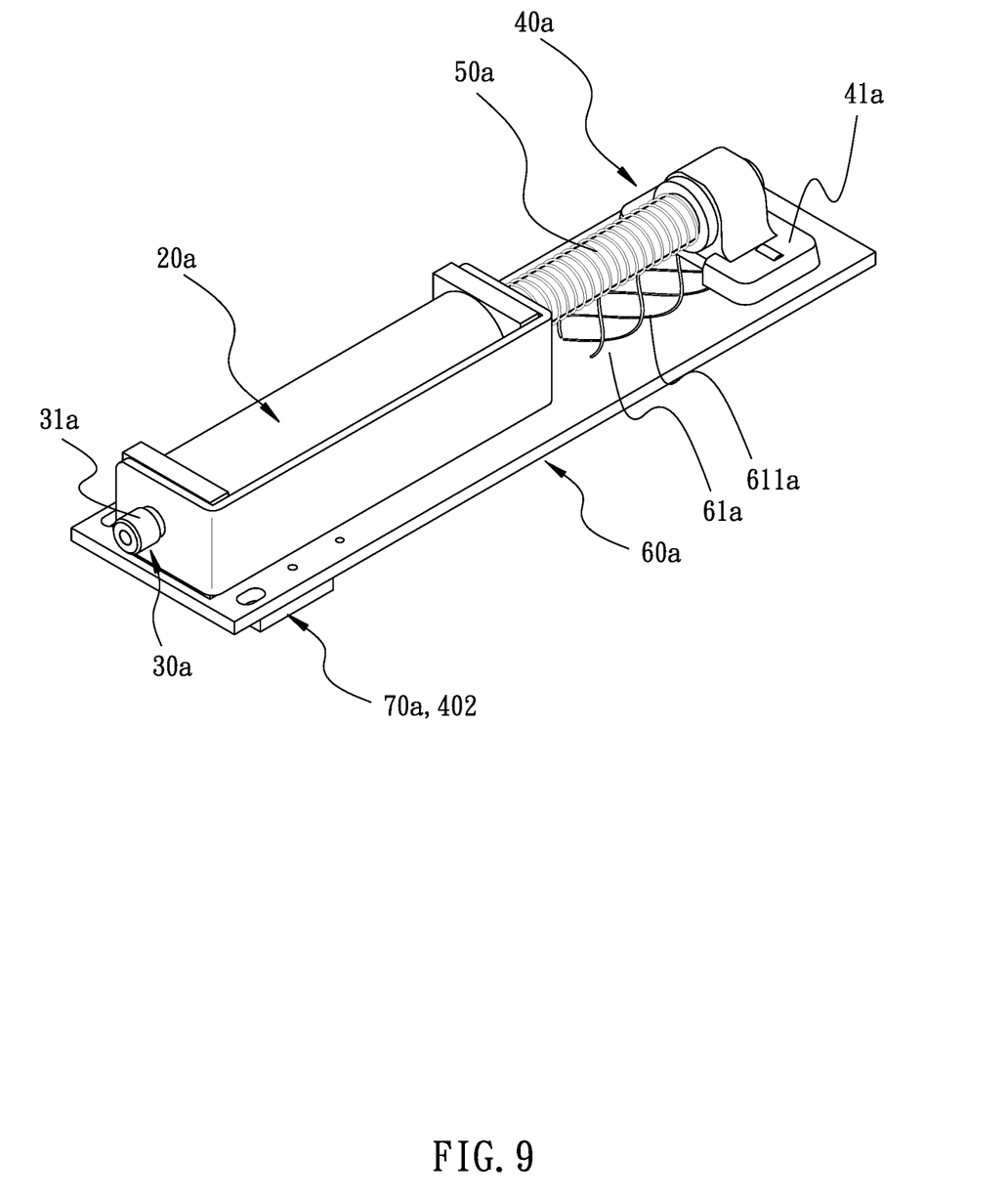
FIG. 9 is a schematic view of the tire tread detection module.
Figure 10:
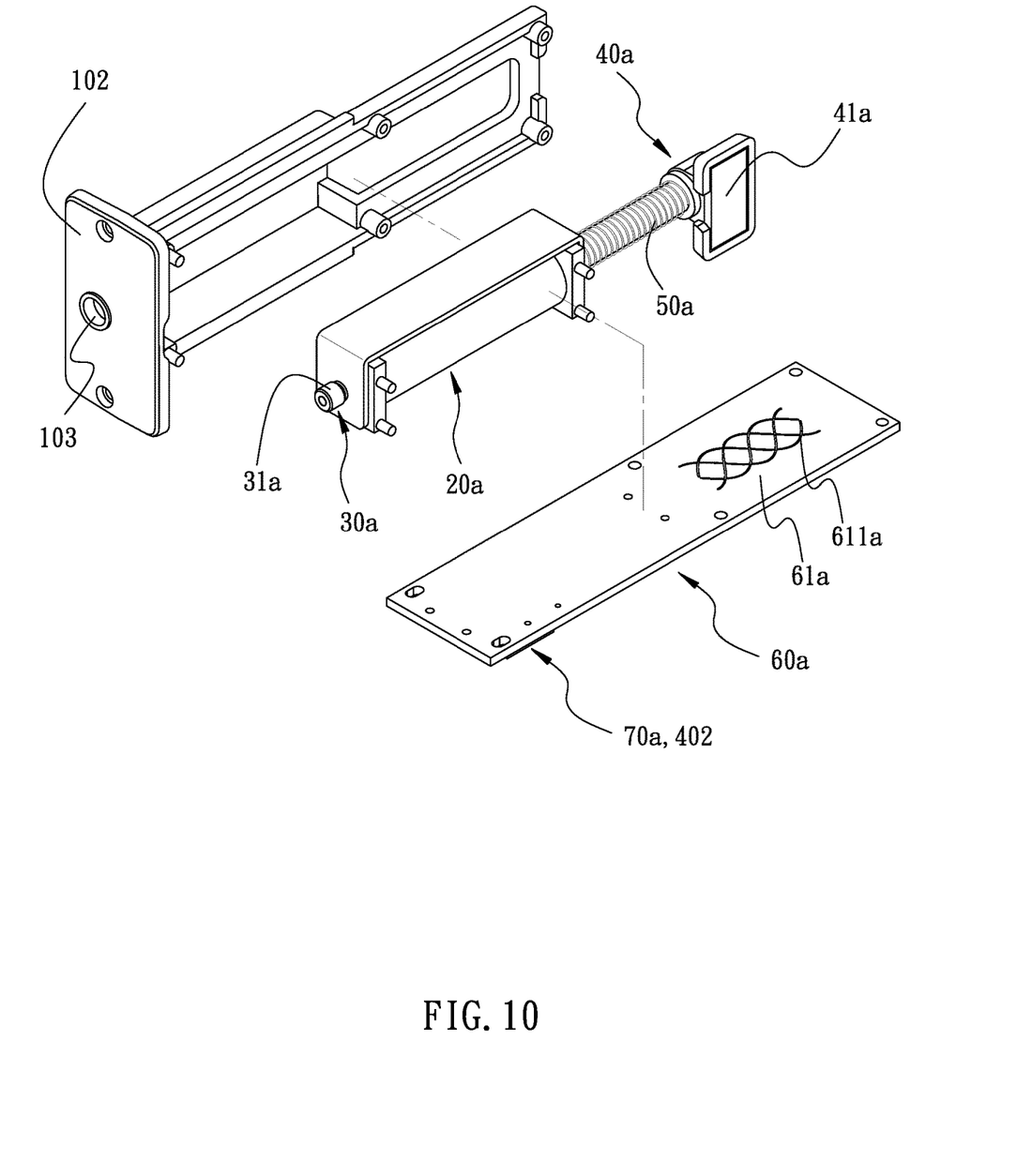
FIG. 10 is an exploded view of FIG. 9.

The tire tread detection module 3 comprises a driving unit 20*a*, a measuring member 30*a*, a positioning member 40*a*, a sense member 60*a*, and a processing unit 70*a*. The driving unit 20*a* is connected with the measuring member 30*a* and the positioning member 40*a*. The driving unit 20*a* drives the measuring member 30 to move for measuring the tread depth of the tire 200. The positioning member 40*a* senses the sense member 60 during the movement of the measuring member 30*a*, such that a measurement signal is generated. The processing unit 70*a* receives the measurement signal and produces a corresponding tread depth value.

When the power module 80*a* supplies the power to the driving unit 20*a*, the power is conducted to the electromagnetic coil of the driving unit 20*a*, so as to drive the measuring member 30*a* and the positioning member 40*a* to linearly move with respect to the casing 1.

Referring to FIG. 9 and FIG. 10, the measuring member 30*a* is formed in a rod shape and comprises a detection end 31*a* disposed in adjacent to the opening 103. Therein, the detection end 31*a* is applied for being inserted in the tread groove 201 of the tire 200. The detection end 31*a* has an outer diameter preferably not larger than 6 mm, so as to be applied for various models of tire 200. The driving unit 20*a* is allowed to drive the measuring member 30*a* to move between a retract position and a protrude position. When the measuring member 30*a* is at the retract position, the detection end 31*a* of the measuring member 30*a* is placed between the opening 103 and the housing recess 101. When the measuring member 30*a* moves from the retract position to the protrude position, the detection end 31*a* of the measuring member 30*a* protrudes out from the cover 102 of the casing 1 via the opening 103, so as to protrude into the tread groove 201 of the tire 200 for measuring the tread depth of the tire 200. Therein, the distance between the retract position and the protrude position is defined as the tread depth of the tire 200.

The positioning member 40*a* is disposed in the casing 1. The positioning member 40*a* has a sensing portion 41*a* for establishing a sense connection with the sense member 60*a*. Therein, the sensing portion 41*a* is allowed to be formed in a metal material. When the driving unit 20*a* drives the measuring member 30*a* to move, the positioning member 40*a* is driven to move together with the measuring member 30*a*. In an embodiment of the present invention, the positioning member 40*a* has a spring 50*a* disposed at an outer periphery of thereof, with two ends of the spring 50*a* resting against the driving unit 20*a* and the sensing portion 41*a*. Therein, when the driving unit 20*a* drives the measuring member 30*a* to move from the retract position to the protrude position, the spring 50*a* is compressed.

The sense member 60*a* is fixed in the casing 1. The sense member 60*a* is approximately formed in a plate shape, with a sense area 61*a* disposed at one lateral of the sense member 60*a* facing the positioning member 40*a*. The sense area 61*a* corresponds to a movement range of the positioning member 40*a*. The sense area 61*a* has a detection pattern 611*a*, such that the power supplied by the power module 80*a* is conducted to the detection pattern 611*a*. The detection pattern 611*a* is formed of a magnetic or metal material. When the sensing portion 41*a* of the positioning member 40*a* covers a portion of the detection pattern 611*a*, the measurement signal generated by the sense member 60*a* varies according to the covered portion of the detection pattern 611*a*.

More specifically, when the power supplied by the power module 80*a* is conducted to the detection pattern 611*a*, the portion of the detection pattern 611a of the sense area 61a covered by the sensing portion 41a formed of metal material produces a magnetic field. Therefore, the measurement signal generated by the sense member 60a is defined as the area range of the magnetic field. Also, the minimum detection precision unit is improved to approximate 0.1 mm.

The processing unit 70a is disposed in the casing 1 and coupled with the sense member 60a. The sense member 60a transmits the measurement signal to the processing unit 70a. The processing unit 70a performs a calculation with the measurement signal to acquire the tread depth value. In an embodiment of the present invention, the tread depth value is a character string formed of a numerical value.

The power module 4 is disposed at the body casing 10a and comprises a switch 401 and a power unit 402. The switch 401 is applied for controlling the power unit 402 to provide the power to the driving unit 20a, the sense member 60a, the processing unit 70a, and the display module 90a. The switch 401 is disposed at an outer lateral of the casing 1 away from the opening 103. The switch 401 is allowed to be chosen from a normal open or normal close switch, which is not limited in the embodiment of the present invention. The power unit 402 is disposed in the casing 1. The power unit 402 is allowed to be chosen from a rechargeable form or battery form, which is not limited in the embodiment of the present invention.

The display module 5 is disposed at the outer lateral of the casing 1. In an embodiment of the present invention, the display module 5 is disposed at the outer lateral of the casing 1 away from the opening 103, wherein the display module 5 and the switch 401 are disposed at the same lateral of the casing 1.

Figure 11:
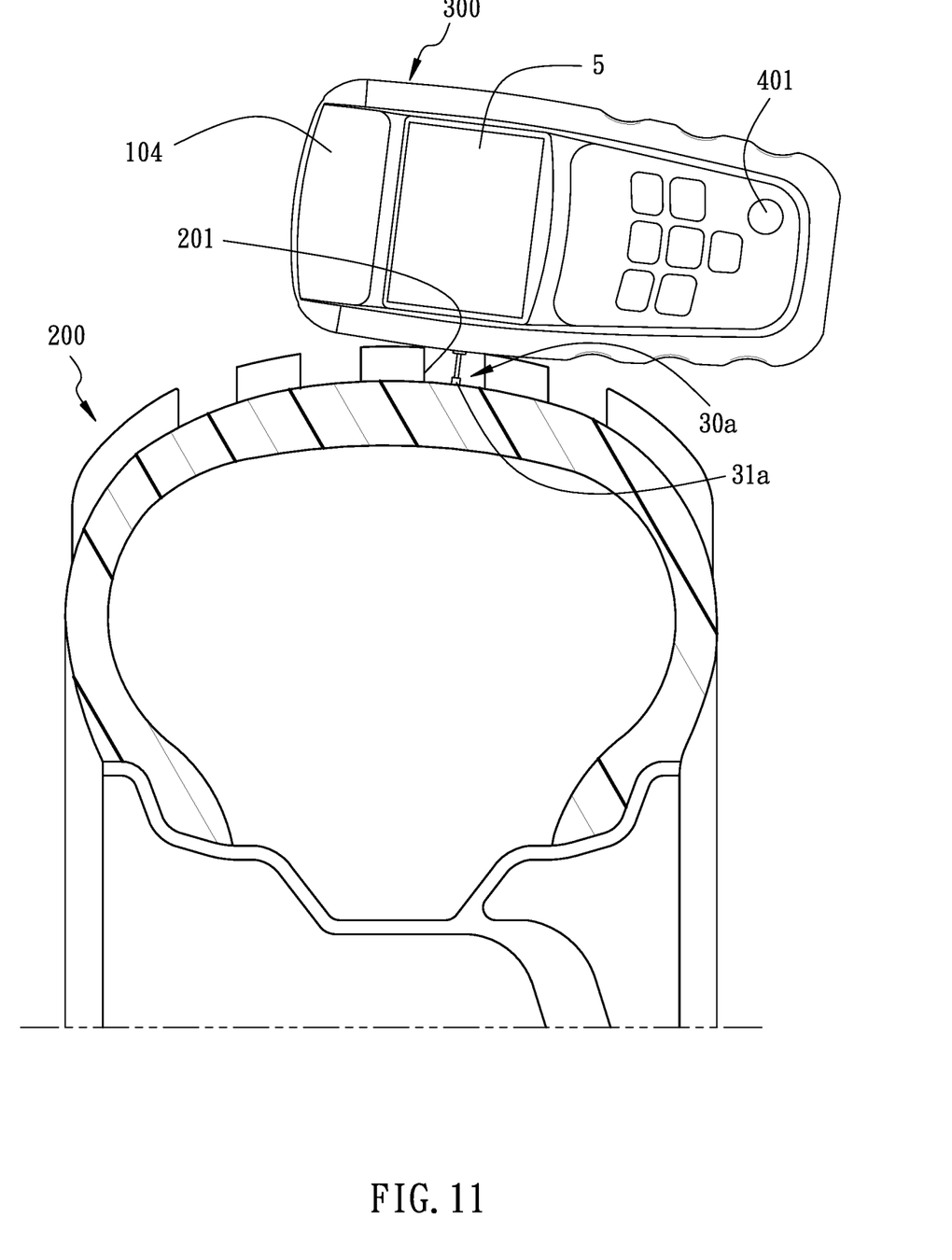
FIG. 11 is a schematic view of the operation status of the tire pressure detector setting apparatus, illustrating the measuring member inserted in the tread groove of the tire tread.

Referring to FIG. 7, FIG. 10, and FIG. 11, when measuring the tread depth of the tire 200, the user rests the cover 102 of the tire pressure detector setting apparatus 300 against the tread face of the tire 200, and aligns the opening 103 with the tread groove 201 of the tire 200. Next, the user presses the switch 401, so that the power unit 402 supplies the power to the driving unit 20a, and the driving unit 20a drives the measuring member 30a to move from the retract position to the protrude position, whereby the detection end 31a of the measuring member 30a rests against the bottom of the tread groove 201. Meanwhile, the positioning member 40a moves together with the measuring member 30a until the detection end 31a reaches the bottom of the tread groove 201, so that the sensing portion 41a covers a portion of the detection pattern 611a, such that the sense member 60a generates the measurement signal according to the covered portion of the detection pattern 611a, and the processing unit 70a transforms the measurement signal to a tread depth value. Then, the processing unit 70a transmits the tread depth value to the display module 5, such that the display module 5 displays the tread depth value to inform the user about the current tread depth of the tire 200.

Further, when the detection end 31a reaches the bottom of the tread groove 201, the power stops to be supplied to the electromagnetic coil of the driving unit 20a. With the resilient force of the spring 50a, the measuring member 30a will move from the protrude position back to the retract position, such that the detection end 31a of the measuring member 30a completely retracts into the opening 103, completing the tread depth detection of the tire 200.

With the foregoing configuration, the present invention achieves following effects.

The measuring member 30 of the tire tread detection apparatus 100 is normally placed at the retract position, such that the detection end 31 of the measuring member 30 is prevented from being exposed from the body casing 10, preventing possible damage of the measuring member 30 from happening and increasing the service life of the tire tread detection apparatus 100.

Upon activating the driving unit 20, the measuring member 30 protrudes to the tread groove 201 of the tire 200 with a high speed. After the detection end 31 reaching the bottom of the tread groove 201, the power stops to be supplied to the driving unit 20. Then, with the resilient force of the spring 50, the measuring member 30 fast retracts into the body casing 10. Therefore, an easy and efficient tire tread depth detection is achieved.

By establishing the sensing connection between the positioning member 40 and the sense member 60, the tread depth value is efficiently and accurately acquired, thus solving the inaccuracy issue of the traditional strain gauge applying tread depth inspection method.

The tire pressure detector setting apparatus 300 provided by the present invention is allowed to achieves an identical function with the aforementioned tire tread detection apparatus 100. The tire pressure detector setting apparatus 300 is able to write the communication protocol into the tire pressure detector via the setting module 2, and also allows the user to carry out the tire tread depth detection process by use of the tire tread detection module 3 when installing the tire pressure detector or detecting the pressure of the tire 200.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. A tire tread detection apparatus for detecting a tread depth of a tire, comprising:
   a body casing;
   a driving unit disposed in the body casing;
   a power module disposed in the body casing for supplying a power to the driving unit;
   a measuring member disposed in the body casing and connected with the driving unit, the driving unit driving the measuring member to move, such that the measuring member protrudes out from the body casing to measure the tread depth of the tire;
   a positioning member disposed in the body casing and connected with the driving unit; and
   a sense member fixed in the body casing, the sense member generating a measurement signal as a tread depth value according to the positioning member,
   wherein a magnetic field is generated when the sense member sensing the positioning member sense each other,
   wherein the sense member has a sense area corresponding to a movement range of the positioning member, the measurement signal generated by the sense member varying according to a movement of the positioning member with respect to the sense area, and
   wherein the sense area is disposed laterally on the sense member facing the positioning member, the sense area comprising a detection pattern, the positioning member covering a portion of the detection pattern, the measurement signal generated by the sense member varying according to a variation of the covered portion of the detection pattern.

2. The tire tread detection apparatus of claim 1, wherein the power module supplies a power to the detection pattern, and the positioning member is formed of a metal material.

3. The tire tread detection apparatus of claim 1, wherein the driving unit drives the measuring member to move between a retract position and a protrude position, and a movement distance between the retract position and the protrude position is defined as the tread depth of the tire.

4. A tire pressure detector setting apparatus with tire tread detection function, which is coupled with a tire pressure detector, the tire pressure detector setting apparatus comprising:
- a casing;
- a setting module disposed in the casing, the setting module comprising a plurality of communication protocol information, such that when the tire pressure detector is coupled with the setting module, one of the plurality of communication protocol of the setting module is written into the tire pressure detector; and
- a tire tread detection module disposed in the casing, the tire tread detection module comprising a driving unit, a measuring member, a positioning member, and a sense member, the driving unit being coupled with the measuring member and the positioning member, such that the driving unit drives the measuring member to protrude out from the casing to measure a tread depth of a tire, and a measurement signal is generated by the sense member as a tread depth value according to the positioning member, wherein a magnetic field is generated when the sense member sensing the positioning member sense each other, wherein the sense member has a sense area corresponding to a movement range of the positioning member, the measurement signal generated by the sense member varying according to a movement of the positioning member with respect to the sense area, and wherein the sense area is disposed laterally on the sense member facing the positioning member, the sense area comprising a detection pattern, the positioning member covering a portion of the detection pattern, the measurement signal generated by the sense member varying according to a variation of the covered portion of the detection pattern.

5. The tire pressure detector setting apparatus of claim 4, further comprising a power module disposed in the casing, the power module supplying a power to the driving unit and the detection pattern, and the positioning member being formed of a metal material.

6. The tire pressure detector setting apparatus of claim 4, wherein the driving unit drives the measuring member to move between a retract position and a protrude position, and a movement distance between the retract position and the protrude position is defined as the tread depth of the tire.

* * * * *